Sept. 29, 1970  D. SCARAMUCCI  3,531,081
VALVE ASSEMBLY WITH INSERTABLE VALVE UNIT
Filed Sept. 30, 1968  6 Sheets-Sheet 1
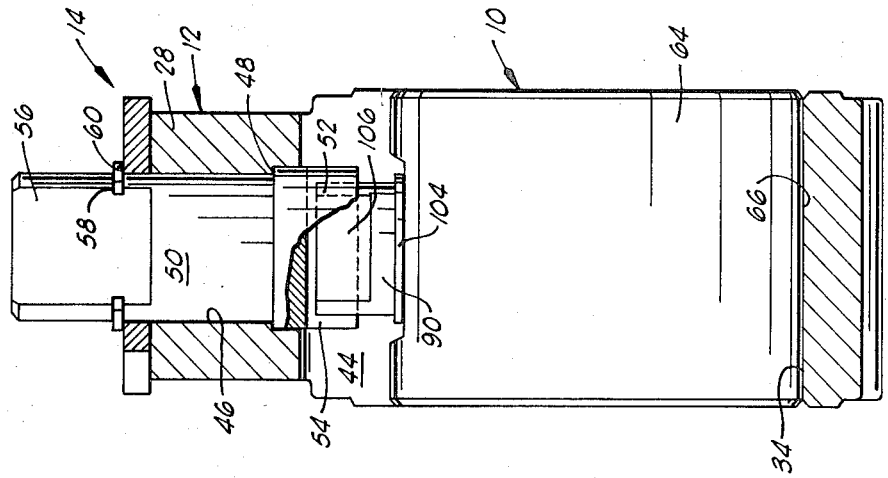
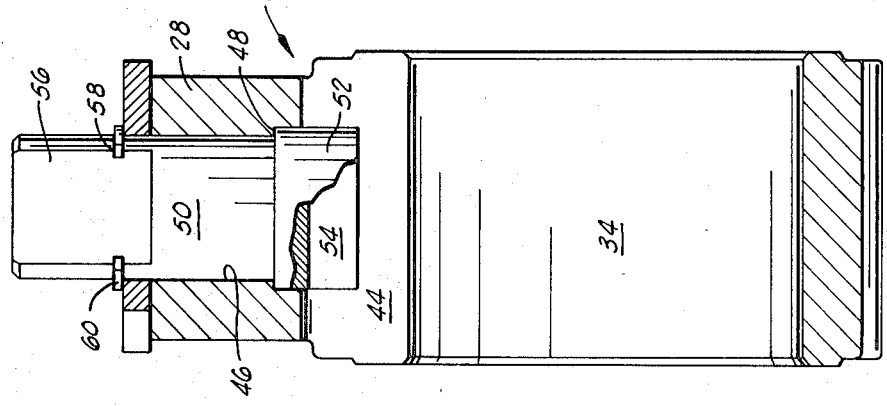
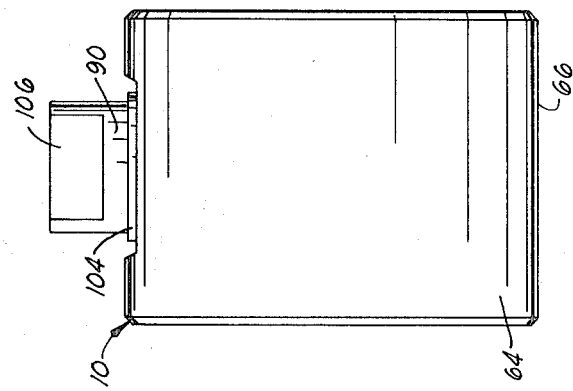
INVENTOR.
DOMER SCARAMUCCI
BY
ATTORNEYS

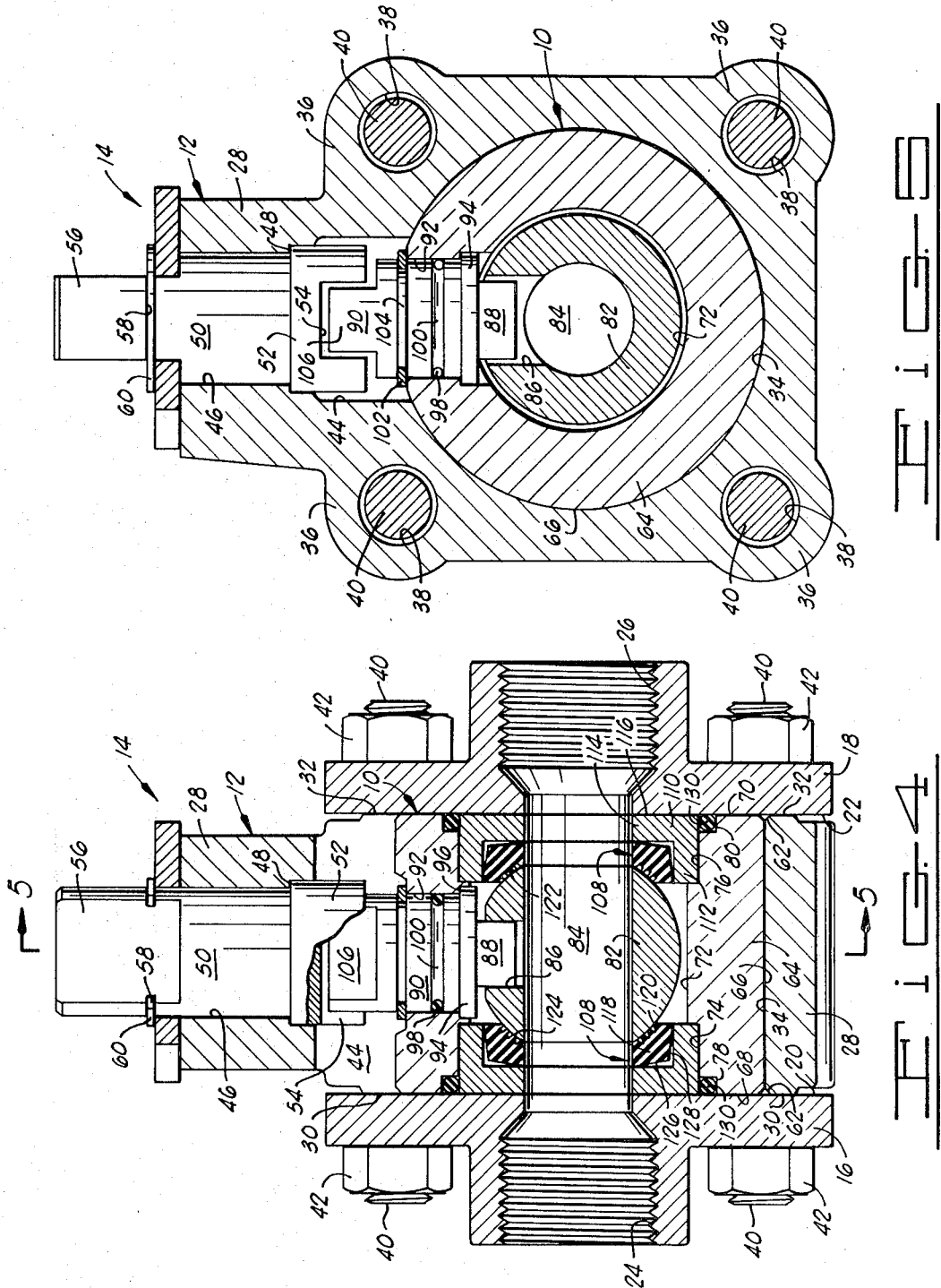

Sept. 29, 1970 D. SCARAMUCCI 3,531,081
VALVE ASSEMBLY WITH INSERTABLE VALVE UNIT
Filed Sept. 30, 1968 6 Sheets-Sheet 3
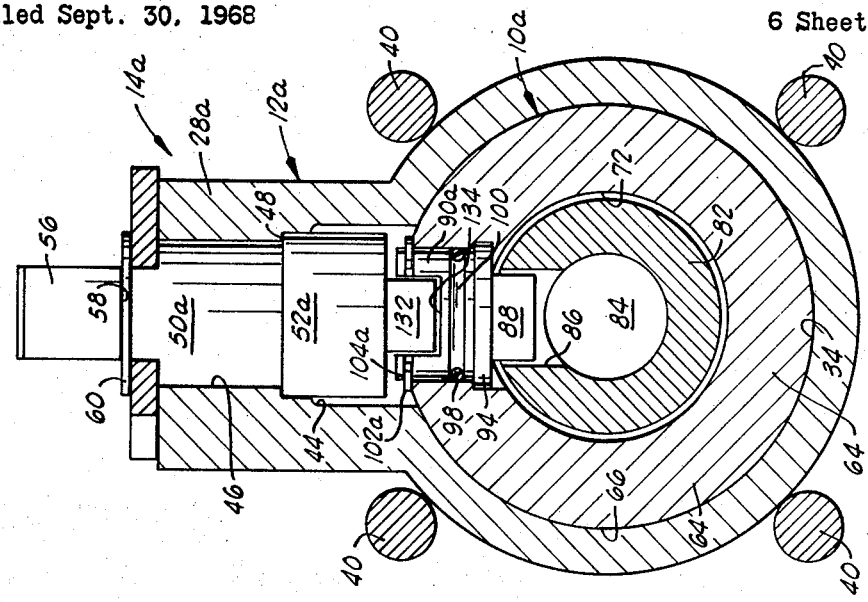
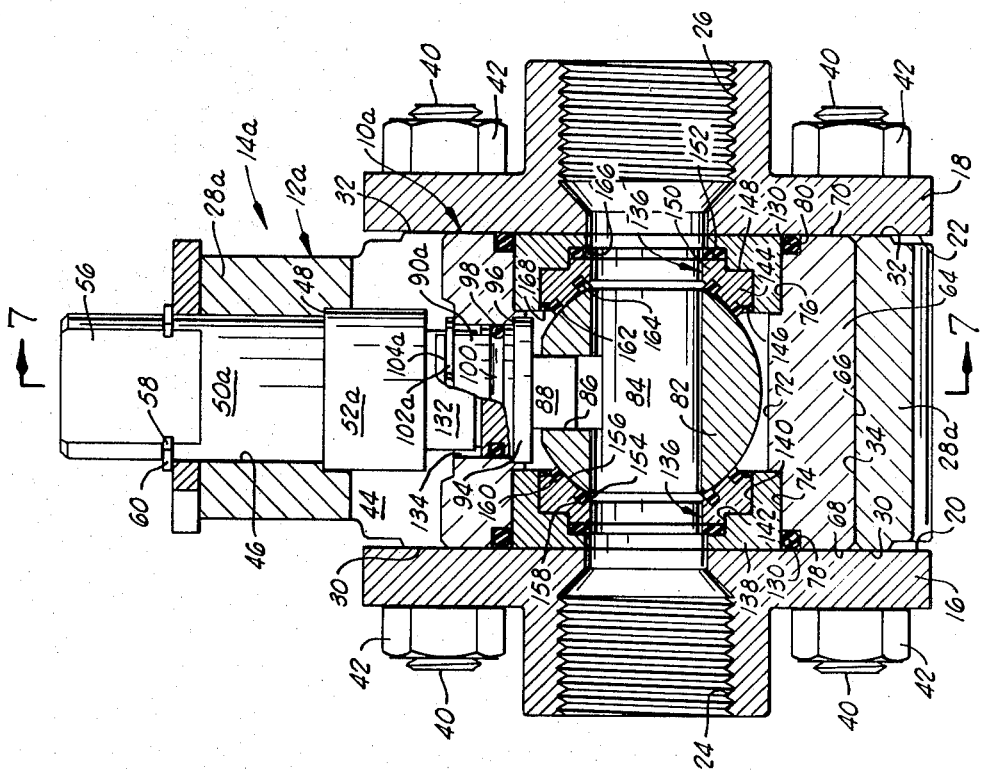
INVENTOR.
DOMER SCARAMUCCI Sept. 29, 1970           D. SCARAMUCCI           3,531,081
VALVE ASSEMBLY WITH INSERTABLE VALVE UNIT
Filed Sept. 30, 1968                         6 Sheets-Sheet 4
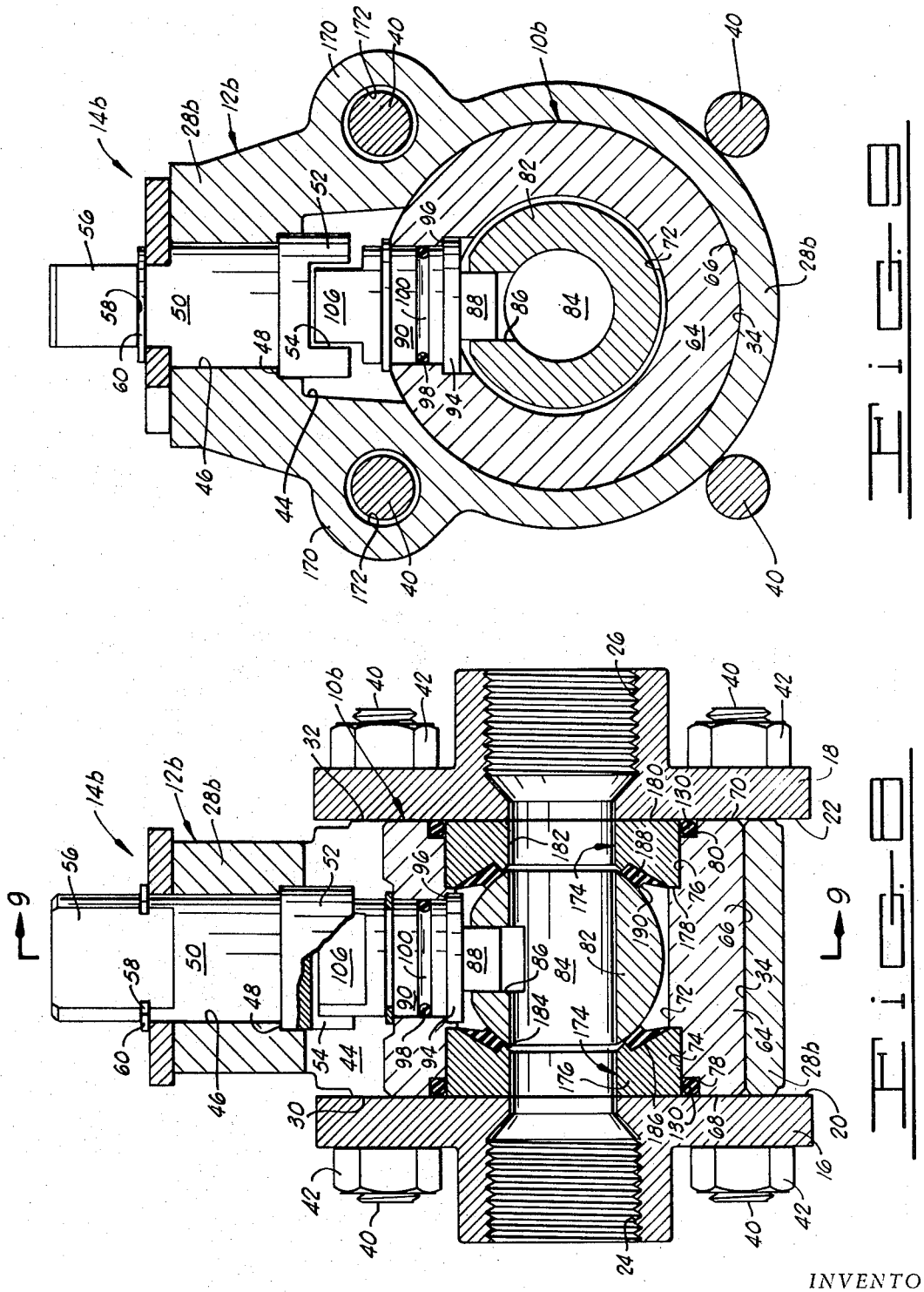
INVENTOR.
DOMER SCARAMUCCI
BY
ATTORNEYS Sept. 29, 1970          D. SCARAMUCCI          3,531,081
VALVE ASSEMBLY WITH INSERTABLE VALVE UNIT
Filed Sept. 30, 1968          6 Sheets-Sheet 5
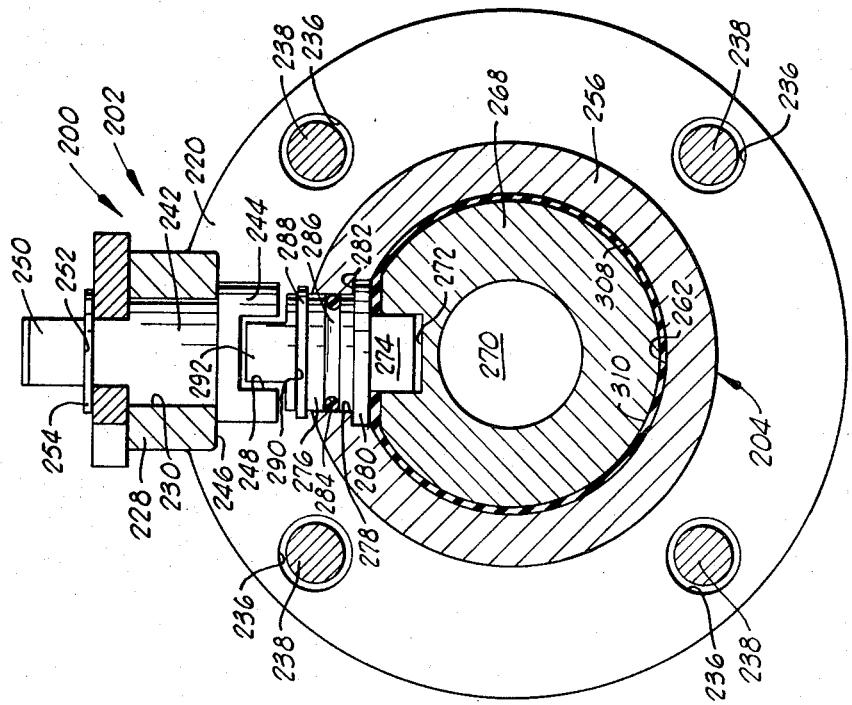
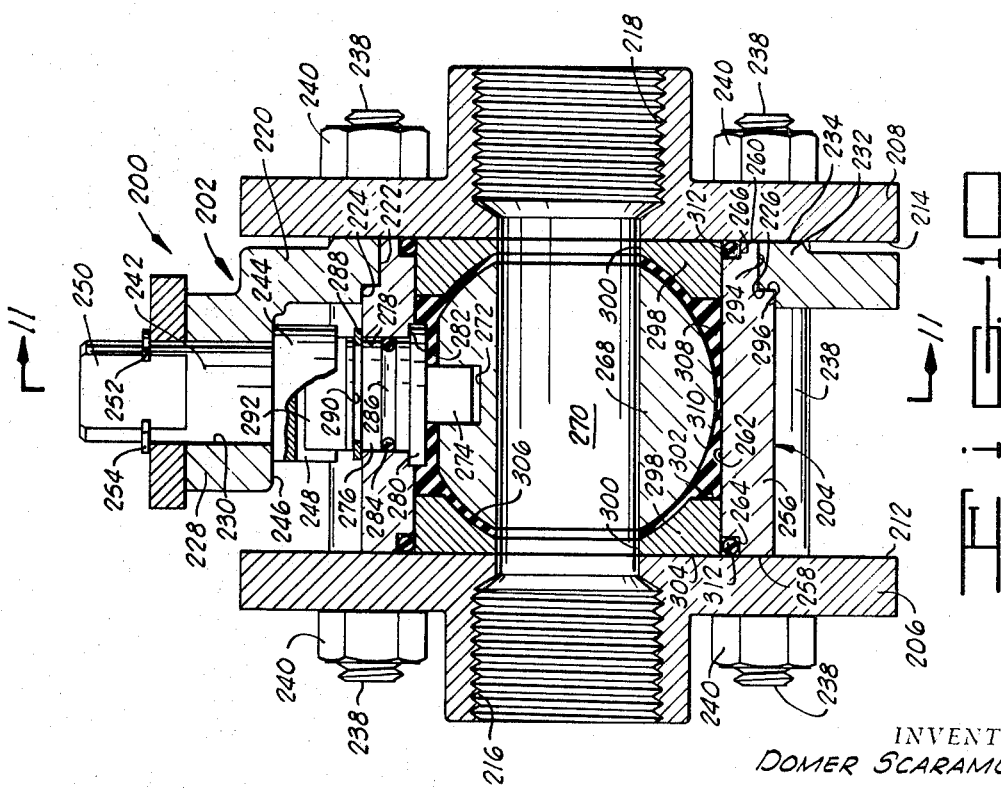
INVENTOR.
DOMER SCARAMUCCI
BY
ATTORNEYS

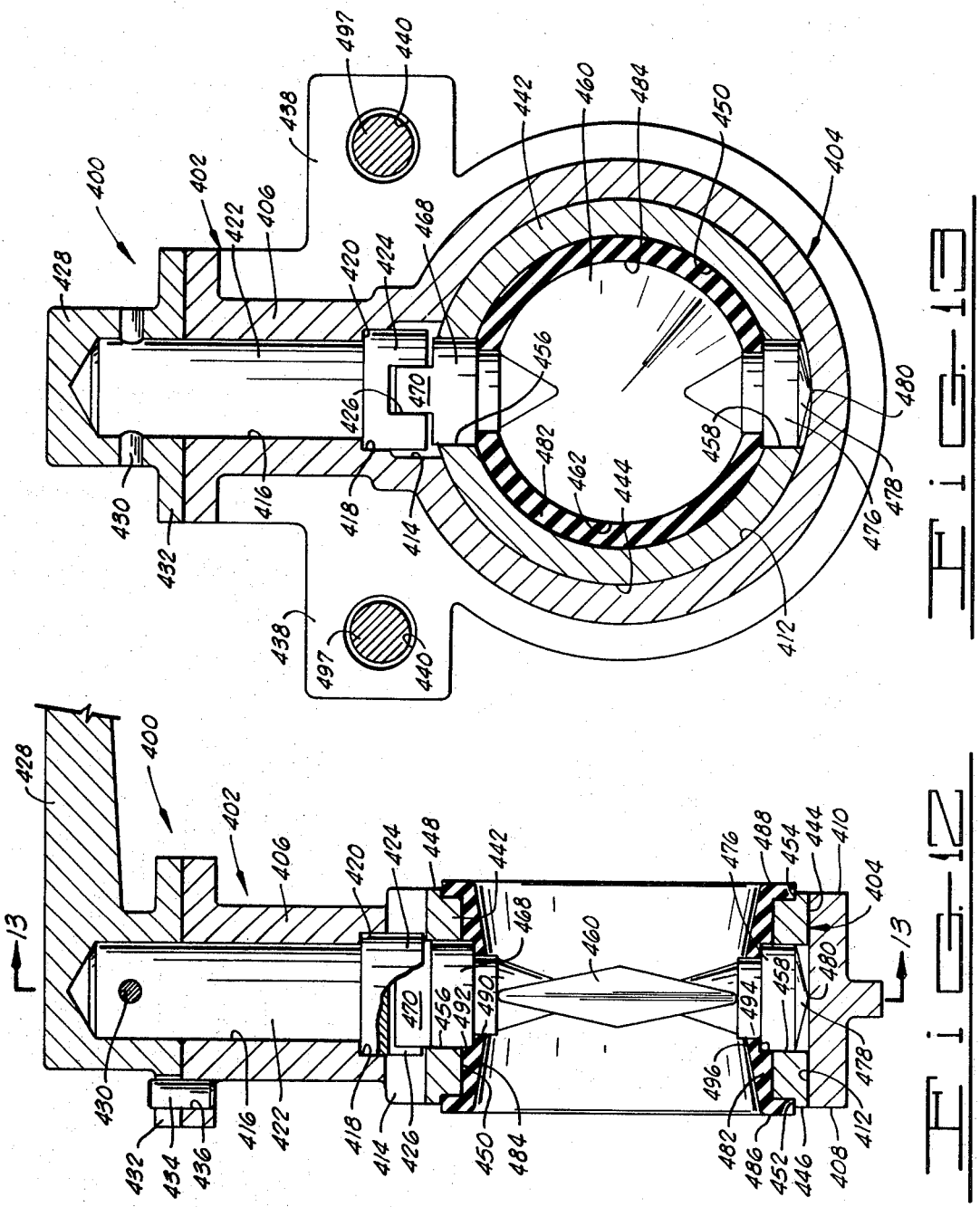

United States Patent Office 3,531,081
Patented Sept. 29, 1970

1

3,531,081
VALVE ASSEMBLY WITH INSERTABLE VALVE UNIT
Domer Scaramucci, 3245 S. Hattie, Oklahoma City, Okla. 73129
Filed Sept. 30, 1968, Ser. No. 763,644
Int. Cl. F16k 51/00
U.S. Cl. 251—151      54 Claims

ABSTRACT OF THE DISCLOSURE

An improved valve assembly for use between flanges basically comprising two units; a valve unit and a housing unit. The valve unit contains all of the components which will be in contact with the fluid flowing through the valve and appropriate sealing means to isolate the fluid flow from the housing unit. The valve unit is sized to slidingly fit lengthwise into the housing unit, thereby providing a valve assembly wherein different valve units may be installed in a single housing unit. The valve unit, is also, provided with appropriate interconnecting means for transmitting the turning movement of a valve operator on the housing unit to the valve member within the valve unit, thereby turning the valve member between open and closed positions.

BACKGROUND OF THE INVENTION

Field of the invention

This invention relates generally to improvements in valves, and more particularly, but not by way of limitation, to an improved valve assembly having a separate valve unit which is installed lengthwise into a housing unit.

Description of the prior art

In the past, valves have generally been constructed incorporating a valve member which is movably disposed in valve housing or body. A valve stem, which extends through the valve body, is connected or interrelated to the valve member for turning the valve member from an open to a closed position. The fluid is retained in the valve body by appropriate seal means which are generally disposed around opposite ends of the valve body and around the valve stem.

When a valve of this type of construction is repaired, it is quite often necessary to remove the valve stem. When this repair is accomplished in the field, as is frequently the case, the seal around the valve stem is easily damaged. Therefore, unless an extreme amount of caution is exercised and a considerable amount of valuable time utilized, there exists the opportunity that the stem and defective seals will be reinstalled in the repaired valve. The result of this occurrence is that there will be a leakage of fluid around the valve stem, which of course, is not desirable from either an operating or a safety viewpoint. There will, of course, also exist other problems, such as extended downtime, encountered in trying to correctly position the valve member with respect to the valve stem.

There are many applications, particularly in the chemical and petro-chemical industries, which require that the components in contact with the fluid flow be constructed of various exotic or expensive materials, such as stainless steel and ceramics. In a valve design such as described above, this requirement represents a considerable increase in the cost of a particular valve, since the valve body, which is in contact with the fluid, must also provide the operating and structural strength requirements of the valve.

SUMMARY OF THE INVENTION

The present invention contemplates in one aspect, a valve assembly for use between a pair of pipe flanges. The

2 valve assembly includes a housing having opposite end faces, a bore extending therethrough, and adapted to be supported between said flanges. A first valve stem is journaled in the housing. A valve unit is supported in the housing. The valve unit includes a valve body of a size to be slid lengthwise into the housing and having a bore extending lengthwise therethrough. The valve unit also includes means sealing the opposite ends of the body to the flanges, isolating the housing from the fluid flowing through the flanges. A valve member is rotatably supported in the bore of the valve body for opening and closing the valve assembly. A second valve stem is journaled in the valve body, adapted to be connected to said first valve stem when the valve unit is inserted in the housing unit for transmitting the turning movement of the first valve stem to the valve member. Seat means are disposed in the valve unit to provide a seal between the valve member and the valve body when the valve member is turned to a closed position.

An object of the invention is to provide a valve assembly wherein the opportunity for installing a repaired valve stem having a defective seal is virtually eliminated.

Another object of the invention is to provide a valve assembly wherein the repair of the components in contact with the fluid flow requires less down-time and is more efficient.

A further object of the invention is to provide a valve assembly wherein the material used in construction of the components in contact with the fluid flow is reduced to a minimum, thereby reducing the manufacturing cost of the valve.

A still further object of the invention is to provide a valve assembly wherein the components in contact with the fluid flow are housed in a separate valve unit and wherein various valve units are interchangeable with a single housing unit.

One further object of the invention is to provide a valve assembly wherein the fluid is isolated from the housing unit by appropriate sealing means.

A yet further object of the invention is to provide a valve assembly wherein the housing unit provides the operational and structural support for the valve assembly and is adapted to receive and cooperate with a valve unit containing all components which will be in contact with the fluid flowing through the valve.

Another object of the invention is to provide a valve assembly which is economical in construction and operation.

BRIEF DESCRIPTION OF THE DRAWINGS

FIG. 1 is a side elevation of a valve unit.

FIG. 2 is a side view of a housing unit, showing the housing unit in partial cross section.

FIG. 3 is a side view of a valve assembly wherein the valve unit, shown in FIG. 1, has been inserted into the housing unit, shown in FIG. 2.

FIG. 4 is a sectional view of a valve assembly assembled between two flanges.

FIG. 5 is a sectional view of the valve assembly of FIG. 4 taken substantially along the lines 5—5 in FIG. 4.

FIG. 6 is a view similar to FIG. 4, but illustrating a modified valve assembly.

FIG. 7 is a sectional view of the valve assembly of FIG. 6 taken substantially along the lines 7—7 of FIG. 6.

FIG. 8 is a view similar to FIG. 4 but illustrating another modified valve assembly.

FIG. 9 is a sectional view of the valve assembly of FIG. 8 taken substantially along the lines 9—9 of FIG. 8

FIG. 10 is a sectional view of another valve assembly.

FIG. 11 is a sectional view of the valve assembly of FIG. 10 taken substantially along the lines 11—11 of FIG. 10.

FIG. 12 is a sectional view of still another valve assembly.

FIG. 13 is a sectional view of the valve assembly of FIG. 12 taken substantially along the lines 13—13 of FIG. 12.

EMBODIMENT OF FIGS. 1 THRU 5

Referring to the drawings in detail, and to FIGS. 1, 2 and 3 in particular, the invention as shown therein may be observed to basically comprise a valve unit 10 (shown in FIG. 1) and a housing unit 12 (shown in FIG. 2). The valve unit 10 contains all of the components which will be in contact with the fluid flowing through the valve and may, therefore, be constructed of any material compatible with the fluid being controlled. The housing unit 12 is constructed to provide structural support and operational strength for the valve unit 10 and may, therefore, be constructed of any material such as cast iron or cast steel, which will provide the required strength for the particular size and application. The valve unit 10 also contains appropriate sealing means, to be more fully described hereinafter, to prevent leakage between the valve unit assembly 10 and the housing unit assembly 12. It is, therefore, not necessary that the housing unit assembly 12 be constructed of material compatible with the fluid.

The valve unit 10 and the housing unit 12 are provided with mating surfaces so that the valve unit 10 may be inserted lengthwise into the housing unit 12 and thereby provide a complete valve assembly 14, as shown in FIG. 3. From the foregoing it is apparent that various valve units, constructed of different materials, may be interchanged with a single housing unit, as will be more fully described hereinafter.

The valve assembly 14 is shown more clearly in FIGS. 4 and 5, and, as shown therein, is disposed generally between flanges 16 and 18. Each of the flanges 16 and 18 includes an end face 20 and 22, and a threaded opening 24 and 26, respectively. The threaded openings 24 and 26 are axially aligned and sized to receive the threaded ends of adjacent sections of a conduit (not shown).

The housing unit 12 includes a tubular housing 28 having opposite end faces 30 and 32, and a bore 34 extending therethrough. A flange portion 36 is formed on the outer periphery of housing 28 and, as shown more clearly in FIG. 5, four holes 38 are provided therethrough. The housing unit 12, the valve unit 10 and the flanges 16 and 18 are held in assembled relationship by a plurality of threaded bolts 40 that extend through the flanges 16 and 18 and through the holes 38 of housing 28. Each of the bolts 40 is provided with a pair of threaded nuts 42 that engage the flanges 16 and 18.

A slot 44 is formed in the housing 28 along the top of the bore 34, for purposes which will become more apparent hereinafter. An aperture 46 extends transversely through the housing 28 intersecting the slot 44. The aperture 46 is provided with a counterbore adjacent its intersection with the slot 44, thereby providing a planar surface 48 in the housing 28.

A first valve stem or operator 50 is journaled in the housing 28 and extends through the transversely extending aperture 46. Thus the centerline of the first valve stem 50 extends at a right angle to the centerline of the bore 34 of housing 28. The first valve stem 50 includes a lower flange portion 52 that engages the downwardly facing surface 48 in the housing 28, encircling the aperture 46, to limit the upward movement of the first valve stem 50, in the aperture 46. A slot 54 is formed in the flange portion 52 of first valve stem 50 for reasons which will become more apparent hereinafter.

The upper portion 56 of the first valve stem 50 is adapted to receive and cooperate with a valve handle or other suitable operator (not shown) for turning the valve stem 50 of housing unit 12 and thereby rotating a valve member from a fully open to a fully closed position, as will be more fully described hereinafter. As well known in the art, various forms of valve handles and connections may be used. In one form, for example, the handle is connected to the upper portion 56 of the first valve stem 50 by a pin, and includes a lug portion that is engageable with a pair of abutments on the housing 28 to limit the rotational movement of the handle and the interconnected valve member to approximately 90 degrees.

A groove 58 is formed in the upper portion 56 of the first valve stem 50 and a retaining ring 60 is disposed in groove 58 to limit the downward movement of the first valve stem 50 of housing unit 12 in the aperture 46 of housing 28.

The inner periphery of end faces 30 and 32 of housing 28 are provided with champhers 62 to more easily accommodate the installation of the valve unit 10 which will be more fully described hereinafter.

The valve unit 10 includes a valve body 64 having an outer periphery 66 sized to slidingly fit into bore 34 of housing 28, and having opposite end faces 68 and 70. A bore 72 extends through the valve body 64 intersecting the end faces 68 and 70 to form the valve chamber of the valve. Counterbores 74 and 76 are formed in the valve body 64 of valve unit 10 adjacent the end faces 68 and 70 respectively. Additional counterbores 78 and 80 are formed in a portion of the counterbores 74 and 76 respectively, and are, also, located adjacent the end faces 68 and 70.

A spherical valve member, that is a valve ball 82, is movably disposed in the bore 72 of valve body 64. The valve ball 82 has a port 84 extending therethrough. When the valve ball 82 is in the open position, as shown in FIGS. 4 and 5, the port 84 of valve ball 82 is axially aligned with the threaded openings 24 and 26 of flanges 16 and 18 respectively.

The valve ball 82 has a rectangular recess 86 formed in the exterior surface thereof. The exterior recess 86 of valve ball 82 is sized to receive a rectangular end 88 formed on the lower most end portion of a second valve stem 90. The recess 86 of valve ball 82 is longer than the end 88 of the second valve stem 90 to permit movement of the valve ball 82 in a direction parallel to the bore 72 of valve body 64 when the valve ball 82 is turned to the closed position, for reasons which will become more apparent hereinafter.

An aperture 92 extends transversely through the valve body 64 intersecting the bore 72. The second valve stem 90 extends through the transversely extending aperture 92. In addition to the rectangular end 88, the second valve stem 90 includes an exterior flange 94 that engages a downwardly facing surface 96 in the valve body 64 encircling the aperture 92 of valve body 64 to limit the upward movement of the second valve stem 90 in the aperture 92. An O-ring seal 98 is disposed in an annular groove 100 formed in the second valve stem 90 and is arranged to provide a fluid tight seal between the valve body 64 and the second valve stem 90 thereof.

A retaining ring 102 is disposed in a second annular groove 104 formed in the second valve stem 90 and limits the downward movement of the second valve stem 90 in the aperture 92. A rectangular end 106 is formed on the upper portion of the second valve stem 90 and is sized to matingly fit into the slot 54 of the first valve stem 50 when the valve unit 10 is inserted in the housing unit 12, and thereby transmit the turning movement of the first valve stem 50 to the valve ball 82.

The bore 72 and the counterbores 74 and 76 of valve body 64 are provided to receive and cooperate with the upstream and downstream seat assemblies 108. In a preferred form, and as shown more clearly in FIG. 4, the upstream and downstream seat assemblies 108 are of identical construction and include a relatively rigid seat ring 110, having an L-shaped cross-section and leg portions 112 and 114 thereof. The outer periphery of ring 110 is sized to fit in the respective counterbore 74 or 76 of valve body 74.

The non-valve member end 116 of ring 110 is shaped normal to the axis of the valve unit 10 to abut the respective end face 20 or 22 of flange 16 or 18. An annular seal member 118 is disposed between the leg portions 112 and 114 of each ring 110. Each seal member 118 of seat assembly 108 has a valve member end surface 120 thereon configured to sealingly engage the exterior surface of the valve ball 82. The surface 120 of each member 118 is formed on a radius that is slightly less than the radius of the valve ball 82. The surface 120 of each seal member 118 is further provided with a plurality of annular grooves 122 therein forming a plurality of lands 124 thereon. The grooves 122 are widest adjacent the valve ball 82 whereby the lands 124 have a trapezoidal cross-sectional configuration with the smaller ends of the lands 124 engage the valve ball 82.

The sides 126 and 128 of seal member 118 are tapered and, as shown in FIG. 4, generally meet at an angle substantially greater than ninety degrees to form a gap or chamber between the sides 126 and 128 of seal member 118 and the adjacent leg portions 112 and 114 of ring 110, for reasons which will become more apparent hereinafter.

An O-ring seal 130 is disposed in each counterbore 70 and 72 to sealingly engage the end faces 20 and 22 of flanges 16 and 18, respectively, and to sealingly engage the ring 110 of the respective seat assembly 108.

OPERATION OF FIGS. 1 THRU 5

As previously mentioned, the valve assembly 14 basically comprises two units; the valve unit 10 and the housing unit 12. As more clearly illustrated in FIGS. 1, 2 and 3, the valve unit 10 (FIG. 1) and the housing unit 12 (FIG. 2) are combined to form the valve assembly 14 (FIG. 3) by first turning the first valve stem 50 of housing unit 12, in a manner previously described, to a position wherein the slot 54 of first valve stem 50 is axially aligned with the bore 34 of housing unit 12. The second valve stem 90 of valve unit 10 is turned to a position wherein the mating sides of the rectangular end 106 of second valve stem 90 are axially aligned with the bore 72 of the valve unit 10.

In this position, the valve unit 10 will slide lengthwise into the bore 34 of the housing unit 12, the outer periphery 66 of valve unit 10 being sized to slidingly fit into the bore 34. As the valve unit 10 slides into the housing unit 12 the rectangular end 106 of second valve stem 90 will basically travel in the area provided by the slot 44 of housing 28. The rectangular end 106 of second valve stem 90 is sized to fit into the slot 54 of first valve stem 50. Thus, in the operating position, shown in FIG. 3 and more clearly in FIG. 5, the rectangular end 106 of second valve stem 90 is aligned with the first valve stem 50 of housing unit 12 and the rectangular end 106 of second valve stem 90 is generally disposed in slot 54 of first valve stem 50.

The flanges 16 and 18 are then disposed on opposite ends of the valve unit assembly 10 and the housing unit 12, and the assembly as shown in FIGS. 4 and 5 is held in assembled relationship by the bolts 40 which extend through the flanges 16 and 18 and through the holes 38 of the housing 28. The valve assembly 14 (shown in FIGS. 4 and 5) is then secured into position by the nuts 42 disposed on opposite ends of the bolts 40.

When the valve handle (not shown) is turned, thereby turning the first valve stem 50 of housing unit 12, the turning motion is transmitted to the valve ball 82.

The valve ball 82 may, thus, be turned or rotated from the open position shown in FIGS. 4 and 5 to the closed position, that is, the position wherein the port 84 of valve ball 82 is at a right angle to the threaded openings 24 and 26 of flanges 16 and 18. In this position, fluid will not flow through the valve.

When the valve ball 82 of valve unit 10 is in the open position and fluid is flowing therethrough, it may be observed in FIGS. 4 and 5 that the fluid is isolated from the housing unit 12 by the O-rings 98 and 130. The O-ring 98 of second valve stem 90 sealingly engages the second valve stem 90 and the walls of aperture 92 of valve body 64 and thus prevents the leakage of fluid therebetween. The O-rings 130 of valve body 64 sealingly engage the valve body 64 of valve unit 10, the end faces 20 and 22 of flanges 16 and 18, respectively, and the seat rings 110 of seat assemblies 108 and thus prevent any leakage of fluid therebetween.

Since the components of the housing unit 12 will not be in contact with the fluid flowing through the valve, the housing unit assembly 12 may be constructed of any material such as cast iron or cast steel, the main considerations being strength and the economical construction of the housing unit 12.

The various components of the valve unit 10 may be constructed of any material compatible with the fluid flowing through the valve. In many applications, those components in contact with the fluid are specified to be constructed of a variety of exotic or expensive materials such as stainless steel or ceramics. Since the housing unit 12 provides the operational and structural strength requirements for the valve assembly 14, it follows that use of such materials in the valve unit 10 may be kept at a minimum in the present invention.

As previously mentioned, the rectangular end 88 of second valve stem 90 is slightly smaller than the slot 86 in the surface of valve ball 82. Therefore, when the valve ball 82 is turned to the closed position, the valve ball 82 will be free to move upstream and downstream. It is apparent that the valve ball 82 is of the type known in the art as a "floating" valve member or ball. Assuming that a pressure exists in the inlet of the valve, a pressure differential will be applied across the valve ball 82 and the valve ball 82 will be moved downstream to engage the downstream seat 108. When the valve ball 82 seats against the downstream seat assembly 108, the seal member 118 of the respective seat assembly 108 will sealingly engage the exterior surface of the valve ball 82. More particularly, the lands 124 of the respective seal member 118 will sealingly contact the valve ball 82.

A certain amount of fluid pressure will be trapped in the grooves 122 of the downstream seal member 118. This condition will result in a series of staged differential pressure seals being established across the surface of the respective seal member 118 with each seal member or ring cooperating with the next one to create a fluid tight seal.

In valve seats with relatively smooth sealing surfaces, particles tend to become trapped between the surface of the valve member and the seal member, and as the valve member is turned an abrasive type wearing occurs at the surface of the seal member. The result of this occurrence is a premature wearing of the seat assembly. In the seat assembly as shown more clearly in FIG. 4, any particles which become wedged between the surface of the valve ball 82 and the seating surface of seal member 118 will fall into the grooves 122 and will then be washed away during the next opening of the valve ball 82, thereby eliminating the problem of premature wearing described above.

In FIG. 4, it may be observed that sides 126 and 128 of each seal member 118 are tapered. The tapered sides 126 and 128 permit the respective seal member 118 to self adjust to compensate for a varying valve load and seal engagement demand. The tapering of the sides 126 and 128 also permits the seal members 118 to self compensate for any swelling which may occur in the valve sealing members 118 and likewise any wearing which will occur to the sealing members 118.

Should the components of the valve unit 10, such as the valve ball 82, wear to the extent that replacement or repair is necessary, the entire valve unit 10 is replaced. The valve unit 10 is slipped out of the housing unit 12, by following the procedure previously described for the insertion of the valve unit 10, and a new valve unit is installed. Since the valve unit 10 is assembled at the manufacturing plant under optimum conditions, the possibility of a defective seal being replaced in the repaired valve is virtually eliminated. It is also apparent that the above repair procedure results in a more efficient field repair of the valve with less downtime.

In the form of the invention herebefore described and shown in FIGS. 4 and 5, the housing unit 12 is designed to provide the operational and structural strength requirements for the valve assembly 14, and the housing unit 12 is isolated from the fluid flowing through the valve as previously described. Thus, in those situations where the components of the valve is contact with the fluid must be constructed of expensive materials, the use of such materials and, therefore, the cost of the valve is kept at a minimum.

If it becomes necessary to change the service of the particular valve, wherein different materials of construction are to be used for the components in contact with the fluid, a new valve unit 10 is merely inserted in the housing unit 12, thus eliminating the additional cost of a new housing unit.

EMBODIMENTS OF FIGS. 6 AND 7

A modified valve assembly 14a is shown in FIGS. 6 and 7, and basically comprises a modified valve unit 10a and a modified housing unit 12a. The housing unit 12a and the valve unit 10a are constructed exactly like the housing unit 12 and the valve unit 10, shown in FIGS. 4 and 5, except as hereinafter described.

As may be observed more clearly in FIG. 7, the housing nuit 12a does not have a flange portion with holes provided therein to accommodate the bolts 40. The housing unit 12a is provided with an outer periphery, which is sized, such that when the housing unit 12a is disposed between flanges 16 and 18 and assembled therebetween by bolts 40, the bolts 40 will extend around and contact the outer periphery of housing 28a of housing unit 12a and thus provide the support for the valve assembly 14a.

The first valve stem 50a of housing unit 12a is constructed exactly like the first valve stem 50 shown in FIGS. 4 and 5, except that no groove is provided in the flange portion 52a. A rectangular end 132 is provided on the flange portion 52a of first valve 50a, for reasons which will become more apparent hereinafter.

The second valve stem 90a of valve unit 10a is constructed exactly like the second valve stem 90 of valve unit 10 shown in FIGS. 4 and 5, except that the upper portion of second valve stem 90a is provided with a groove 134, which is sized to receive and cooperate with the rectangular end 132 of first valve stem 50a when the valve unit 10a is inserted in housing unit 12a. This interconnection will transmit the turning movement of the first valve stem 50a of housing unit 12a through the second valve stem 90a to the valve ball 82, in much the same manner as described for valve assemblp 14 (FIGS. 4 and 5). It may be observed that a pair of modified partial retaining rings 102a are disposed in the modified groove 104a. The modified retaining rings 102a are semi-circular in shape and this modification is provided to accommodate the groove 134 formed in the upper portion of second valve stem 90a.

The valve unit 10a is provided with upstream and downstream seat assemblies 136, which in a preferred form and as shown more clearly in FIG. 6, are of identical construction. Each of the seat assemblies 136 of valve unit 10a basically comprises a supporting ring 138 having first and second annular grooves 140 and 142 respectively formed therein. As clearly shown in FIG. 6, the second annular groove 142 is formed in the inner periphery of ring 138 and is of a slightly smaller diameter than the first annular groove 140 of supporting ring 138. The outer periphery of supporting ring 138 is sized to fit into the respective counterbore 74 or counterbore 76 of valve body 64.

The annular grooves 140 and 142 of each supporting ring 138 are provided to receive and cooperate with a seat ring 144. Each seat ring 144, having a valve-member end 146 and a non-valve member end 148, is disposed in annular groove 140 of the respective supporting ring 138 and is sized to provide a sliding fit therein. An axial flange portion 150, having a non-valve member end 152, is formed on the non-valve member end 148 of each seat ring 144 and extends axially into the second annular groove 142 of the respective supporting ring 138. The outer periphery of each flange portion 150 is sized to provide a sliding fit in counterbore 142 of the respective supporting ring 138.

A substantially flat seating surface 154 is formed on the valve-member end 146 of each seat ring 144 and a central portion 156 thereof is provided to be tangent to the exterior surface of the valve ball 82. Grooves 158 and 160 are formed in the surface 154 of each seat ring 144 and are disposed on opposite sides of the tangent portion 156 of surface 154. Seal members 162 and 164 are disposed in the grooves 158 and 160, respectively. The seal members 162 and 164 of each seat ring 144 extend beyond the surface 154, and, as shown more clearly in FIG. 6, each seal member 164 has a portion thereof exposed to the pressure existing in the respective opening 24 or 26 of flange 16 or 18, and each seal member 162 has a portion thereof exposed to the pressure existing in the valve chamber formed by the bore 72 of valve body 64, for reasons which will become more apparent hereinafter.

An elastomeric pad 166 is bonded to the non-valve member end 152 of each flange portion 150 and is sized to engage the wall formed by the annular groove 142 of the respective supporting ring 138 when the valve ball 82 is in the open position, as shown in FIGS. 6 and 7. A second elastomeric pad 168 is bonded to the valve member end 146 of each seat ring 144 and is sized to sealingly contact the surface of annular groove 140 of the respective supporting ring 138.

OPERATION OF FIGS. 6 AND 7

The operation of the valve assembly 14a will be similar to that described for valve assembly 14 shown in FIGS. 4 and 5. The valve unit 10a is inserted into the housing unit 12a by first turning the first valve stem 50a of housing unit 12a to a position wherein the rectangular end 132 thereof is axially aligned with the bore 34 of housing 28a. The second valve stem 90a of valve unit 10a is then turned to a position wherein the slot 134 is axially aligned with the bore 72 thereof. The valve unit 10a is then slid lengthwise into the bore 34 of housing unit 12a to a position wherein the first valve stem 50a of housing unit 12a is aligned with the second valve stem 90a, of valve unit 10a. In this position, shown in FIGS. 6 and 7, the rectangular end 132 of first valve stem 50a is disposed in slot 134 of second valve stem 90a.

When the valve handle (not shown) is turned, thereby turning the first valve stem 50a of housing unit 12a, the turning motion is transmitted to the valve ball 82 of valve unit 10a through the interconnection at rectangular end 88 and slot 134 of second valve stem 90a with the slot 86 of valve ball 82 and the rectangular end 132 of first valve stem 50a. The valve ball 82 may, thus, be rotated from the open position shown in FIGS. 6 and 7 to the closed position.

The fluid flowing through the valve is isolated from the housing unit 12a in a manner exactly as described for valve assembly 14, FIGS. 4 and 5, by the O-ring 98 of second valve stem 90 and the O-rings 130 disposed in counterbores 78 and 80 of valve body 72.

When the valve ball 82 is rotated to the closed position, a pressure differential will exist across the valve ball 82, causing the valve ball 82 to move downstream, in a manner as previously described. The exterior surface of valve ball 82 will engage the seating surface 154 of the downstream seat ring 144 and move the respective seat ring 144 downstream until the non-valve member end 148 of the respective seat ring 144 abuts the wall formed by annular groove 140 of the respective supporting ring 138. In this position, the valve ball 82 will be supported by the seat ring 144 of downstream seat assembly 136 at the tangent portion 156 thereof, which essentially forms an annular bearing surface for the valve ball 82. Also in this position, the annular seal members 162 and 164 of the downstream seat will be deformed generally between the exterior surface of valve ball 82 and the surface 154 of the respective seat ring 144 and in a direction generally away from the bearing surface formed by the tangent portion 156.

The deformed seal member 162 of downstream seat ring 144 is exposed to pressure existing in the valve chamber formed by the bore 72 of valve body 64 and forms a pressure responsive type seal. The deformed seal member 164 of downstream seat ring 144 is compressed by the valve ball 82 and forms, essentially, a compression type seal. The respective seal member 162, therefore, functions as the primary sealing means, and the respective seal member 164 functions as the secondary sealing means when the seat assembly 136 is utilized in the downstream position.

In the closed position, the elastomer pad 166 of the seat assembly 136, when utilized in the downsteram position, is relatively inactive with respect to functioning as a seal means, and the elastomer pad 168 functions to provide a fluid tight seal between the seat ring 144 and the supporting ring 138.

The elastomer pad 166 of the seat assembly 136, when utilized in the upstream position, will urge the seat assembly to follow the movement of the valve ball 82 in the downstream direction. In this position, the seat assembly 136 will not function to provide a bearing surface for the valve ball 82. However, the surface 154 of the upstream seat assembly 136 will tend to contact the exterior surface of valve member 82 at the tangent 156 thereof. The seal members 162 and 164 of the upstream seat will, therefore, be deformed to some extent, in a manner similar to that described hereinbefore with respect to seat assembly 136 in the downstream position. In this position, the seal member 164 functions as a pressure responsive type seal, and the seal member 162 will function as a compression type seal, or rather as a secondary seal means.

The pressure existing in the inlet of the valve will act upon the elastomer pad 166 of the upstream seat assembly 136, and the pad 166 will, therefore, form a fluid tight seal between the seat ring 144 and the supporting ring 138. The elastomeric pad 168 will remain relatively inactive, since the primary sealing function is provided by the elastomer pad 166, as previously described.

Since the elastomeric pads 168 may be distorted, excessive body pressure in the valve chamber will cause the seat ring 144 in the upstream position to move upstream away from the valve ball 82 and allow a momentary flow between the valve ball 82 and the surface 154 of seat ring 144, thereby relieving an excessive body pressure.

The repair or interchanging of the valve unit 10a is accomplished in the same maner as previously described with respect to valve unit 10 shown in FIGS. 4 and 5. The entire valve unit 10a is replaced, thereby eliminating the chance that a defective O-ring seal 98 of the valve stem 90a might be installed in a repaired valve assembly and the resulting leakage of fluid therearound.

It is also apparent that, since the basic operational and structural strength for the valve assembly 14a is provided by the housing unit 12a, the material used in the construction of the valve unit 10a is kept to a minimum. As previously discussed, the material in contact with the fluid is many times specified to be an expensive or exotic material such as stainless steel or ceramics, thus the cost of the valve assembly 14a is reduced to a minimum in these situations. The fluid flowing through the valve unit 10a is, of course, isolated from the housing unit 12a in a manner similar to that previously described for valve assembly 14 shown in FIGS. 4 and 5.

EMBODIMENT OF FIGS. 8 AND 9

The modified valve assembly 14b shown in FIGS. 8 and 9 is also a variation of the valve assembly 14 shown in FIGS. 4 and 5. The valve assembly 14b basically comprises a modified housing unit 12b and a modified valve unit 10b, assembled between flanges 16 and 18 and held in assembled relationship by a plurality of bolts 40.

The housing unit 12b is constructed exactly like housing unit assembly 12, shown in FIGS. 4 and 5, except the housing 28b of housing unit 12b does not have a flange portion with four holes provided therein to accommodate the bolts 40 as shown on housing 28 of housing unit 12 in FIG. 5. The housing 28b is provided with a pair of flange portions 170 extending outwardly from housing 28b and near the upper portion thereof, each having a hole 172 provided therethrough. The remaining portion of the outer periphery of housing 28b is like the outer periphery of housing 28a shown more clearly in FIG. 7. Therefore, when the valve unit 14b is assembled between the flanges 16 and 18 and through holes 172 in flange portions 170, and the remaining bolts 40 will extend generally around and contact the outer periphery of housing 28b, as shown more clearly in FIG. 9. The valve assembly 14b is then secured into position by the nuts 42 disposed on the opposite ends of the bolts 40.

The valve unit 10b is constructed like the valve unit 10, shown in FIGS. 4 and 5, with the main exception being the seat assemblies 174, shown more clearly in FIG. 8, disposed in counterbores 74 and 76 at opposite ends of the valve body 64.

Each seat assembly 174 of valve unit 10b comprises a ring 176 having a valve-member end 178, a non-valve member end 180 and an inner periphery 182. The inner periphery 182 of each ring 176 is axially aligned with respectie flange opening 24 or 26 when the valve assembly 14b is in the assembled position as shown in FIGS. 8 and 9. In this position the non-valve member end 180 of each ring 176 abuts the respective flange end face 20 or 22.

A substantially flat surface 184 is formed on the valve-member end 178 of each ring 176 and a groove 186 is provided therein. A seal member 188 is bonded in the groove 186 of each ring 176 and is provided with a portion 190 thereof which extends beyond the surface 184 of the respective ring 176 and sealingly engages the exterior surface of valve ball 82.

OPERATION OF FIGS. 8 AND 9

The operation of the valve assembly 14b is similar to that described for valve assembly 14, shown in FIGS. 4 and 5. The valve unit 10b is inserted and interchanged in the housing 12b in a manner exactly like that previously described for valve assembly 14, shown in FIGS. 4 and 5.

One difference in the assembly of valve assembly 14b, is that when the valve unit 10b and the housing unit 12b are disposed between the flanges 16 and 18, two of the bolts 40 will extend through the holes 172 of housing 28b and the remaining bolts 40 will extend around the outer periphery thereof, thus holding the valve assembly 14b in an assembled relation.

The valve ball 82 of valve unit 10b is rotated from a fully open to a fully closed position and the fluid flowing therethrough is isolated within the valve unit 10b in a manner exactly like that described for valve assembly 14, shown in FIGS. 4 and 5. When the valve ball 82 is rotated to a closed position, the valve ball 82 will move downstream and the exterior surface thereof will sealingly engage the extended portion 190 of downstream seal member 188.

It is apparent from the foregoing that this embodiment of the invention will incorporate many of the advantages described for the valve assembly 14 shown in FIGS. 4 and 5.

EMBODIMENT OF FIGS. 10 AND 11

Shown in FIGS. 10 and 11 is another embodiment of a valve assembly which is constructed in accordance with the invention and designated by the general reference character 200. The valve assembly 200 basically comprises a housing unit 202 and a valve unit 204 disposed generally between flanges 206 and 208.

Each of the flanges 206 and 208 includes an end face 212 or 214, and a threaded opening 216 or 218. The threaded openings 216 and 218 are axially aligned and sized to receive the threaded ends of a conduit (not shown).

The housing unit 202 includes a housing 220 having a bore 222 extending therethrough. A counterbore 224, forming a shoulder 226, is provided in one end of bore 222. A flange portion 228 is provided near the upper end of housing 220 and a transversely extending aperture 230 is provided therethrough. A second flange portion 232 having an end face 234 is provided on the housing 220 around bore 222. When the housing 220 is assembled between the flanges 206 and 208, as shown in FIG. 10, the end face 234 of flange portion 232 abuts the end face 214 of flange 208.

The housing 220 of housing unit 202 is also provided with four holes 236 which are placed around the outer periphery of the housing 220. The housing unit 202, the valve unit 204 and the flanges 206 and 208 are held in an assembled relationship by a plurality of bolts 238 which extend through the flanges 206 and 208 and through the holes 236 of housing 220. Each of the bolts 238 is provided with a pair of threaded nuts 240 that engage the flanges 206 and 208.

A first valve stem or operator 242 is journaled in the flange portion 228 of housing 220 and extends through the transversely extending aperture 230. The first valve stem 242 includes a lower flange portion 244 that engages a downwardly facing surface 246 of flange portion 228, to limit the upward movement of the first valve stem 242 in the aperture 230. A slot 248 is formed in the flange portion 244 of first valve stem 242 for reasons which will become more apparent hereinafter.

The upper portion 250 of first valve stem 242 is adapted to receive and cooperate with a valve handle or other operating device (not shown) for turning the first valve stem 242 and thereby rotating the valve member from a fully open to a fully closed position as will be described more fully hereinafter. A groove 252 is formed in the upper portion 250 of the first valve stem 242 and a retaining ring 254 is disposed therein to limit the downward movement of the first valve stem 242.

The valve unit 204 includes a valve body 256 having end faces 258 and 260 and a bore 262 extending therethrough. Counterbores 264 and 266 are formed in the valve body 256 of valve unit 204 adjacent the end faces 258 and 260 respectively.

A valve ball 268, having a flow port 270 extending therethrough, is movably disposed in bore 262 of valve body 256. When the valve ball 268 is in the open position, as shown in FIGS. 10 and 11, the flow port 270 is axially aligned with the threaded openings 216 and 218 respectively.

The valve ball 268 has a rectangular recess 272 formed in the exterior surface thereof. The rectangular recess 272 is sized to receive a rectangular end 274 formed on the lowermost end portion of a second valve stem 276. The recess 272 is longer than the end 274 of second valve stem 276 to permit movement of the valve ball 268 in a direction parallel to the bore 262 of valve body 256 when the valve ball 268 is rotated to a closed position (not shown).

An aperture 278 extends transversely through the valve body 256 intersecting the bore 262 and the second valve stem 276 is journaled in the aperture 278. The second valve stem 276 includes an exterior flange 280 that engages a downwardly facing surface 282 in valve body 256 to limit the upward movement of the second valve stem 276 in the aperture 278. An O-ring seal 284 is disposed in an annular groove 286 formed in the second valve stem 276 and is arranged to provide a fluid tight seal between the valve body 256 and the second valve stem 276.

A retaining ring 288 is disposed in a second annular groove 290 formed in the second valve stem 276 and limits the downward movement of the second valve stem 276 in aperture 278. A rectangular end 292 is formed on the upper portion of second valve stem 276 and is sized to matingly fit into slot 248 of first valve stem 242 when the valve unit 204 is inserted in the housing unit 202, and thereby transmit the turning movement of the first valve stem 242 to the interconnected valve ball 268.

A groove 294, forming a shoulder 296 is formed around the outer periphery of valve body 256, adjacent end face 260 of the valve body. In the assembled position, as shown in FIGS. 10 and 11, it may be observed that the outer periphery of groove 294 is sized to accommodate the housing 220, and the outer periphery of counterbore 224 of housing 220 is sized to accommodate the valve body 256, and further, in this position, the shoulder 226 of counterbore 224 abuts the shoulder 296 of groove 294.

Seat rings 298, shown more clearly in FIG. 10, are disposed in bore 262 of valve body 256, the outer periphery of each seat ring 298 being sized to fit therein. The inner periphery 300 of each seat ring 298 is axially aligned with the respective openings 216 and 218 of flanges 206 and 208. Each seat ring 298 has a valve-member end 302 and a non-valve member end 304, and in the assembled position shown in FIG. 10, the non-valve member end 304 abuts the respective end face 202 or 214 of flanges 206 and 208. A surface 306 is formed on the valve-member end 302 of each seat ring 298 and in a preferred form, is configured to the shape of the exterior surface of the valve ball 268.

An elastomer 308, having a surface 310 shaped to sealingly mate with the exterior surface of valve ball 268, is bonded to the surface 306 and valve; member end 302 of each seat ring 298. The elastomer 308 is also bonded to the adjacent surface of bore 262 of valve body 256.

An O-ring 312 is disposed in each of the counterbores 276 and 260 of valve body 256 to provide a seal between the valve body 256 and the respective end faces 212 and 214 of flanges 206 and 208 and between the valve body 256 and the respective seat rings 298.

OPERATION OF FIGS. 10 and 11

The valve assembly 200 may be assembled in a manner similar to that described for valve assembly 14 shown in FIGS. 4 and 5. In particular, the first valve stem 242 of housing unit 202 is turned to a position wherein the slot 248 of first valve stem 242 is axially aligned with the bore 222 of housing 220. The second valve stem 276 of valve unit 204 is turned to a position wherein the mating sides of rectangular end 292 of second valve stem 276 are axially aligned with the bore 262 of valve body 256. In this position, the valve unit 204 will slide lengthwise into the bore 222 of housing body 220, thereby assuming the assembled position shown in FIGS. 10 and 11, wherein the shoulder 226 of counterbore 224 abuts shoulder 296 of groove 294, and the rectangular end 292 of second valve stem 276 is generally disposed in slot 248 of first valve stem 242. As shown in FIGS. 10 and 11, the first valve stem 242 of housing unit 202 is aligned with the second valve stem 276 of valve unit assembly 204.

In the embodiment of the invention shown in FIGS. 10 and 11, the valve unit 204 may also be installed in a rotated position from that herebefore described. Proceeding in this manner, the first valve stem 242 of housing unit 202 is rotated to a position wherein the axis of the slot 248 is 90 degrees from the axis formed by bore 222 of housing 220. The second valve stem 276 of valve unit 204 is rotated to a position wherein the mating sides of rectangular end 292 of second valve stem 276 is 90 degrees from the axis formed by bore 262 of valve body 256.

The valve unit 204 is then turned to a position wherein the second valve stem 276 is not in alignment with the first valve stem 242. The valve unit 204 is then slid lengthwise into the housing unit 202 until the shoulders 226 and 296 abut. From this position, the valve unit 204 is rotated until the first valve stem 242 is aligned with the second valve stem 276 and the rectangular end 292 of second valve stem 276 is disposed in the slot 248 of first valve stem 242.

The flanges 206 and 208 are then disposed on opposite ends of the valve unit 204 and the housing unit 202, and the combined assembly is held in assembled relationship by the bolts 238 which extend through the flanges 206 and 208.

When the valve handle (not shown) is turned, thereby turning the first valve stem 242, the turning motion is transmitted to the valve ball 268 through the second valve stem 276. The valve ball 268 may, therefore, be rotated from a fully open position (shown in FIGS. 10 and 11) to a fully closed position (not shown).

When the valve ball 268 is in the open position and fluid is flowing therethrough, it may be observed in FIGS. 10 and 11 that any leakage of the fluid from within the valve unit assembly 204 is prevented by the O-ring seals 312 and the elastomer 308. The O-rings 312 in counterbores 264 and 266 sealingly contact end faces 212 and 214 of flanges 206 and 208 and the valve body 256, thereby preventing leakage therebetween. The elastomer 308 sealingly contacts a portion of flange portion 280 of second valve stem 276 and a portion of rectangular end 274 of second valve stem 276, thereby preventing leakage of fluid between the second valve stem 276 and the aperture 278 of valve body 256. The O-ring 284 of second valve stem 276 also prevents leakage through the aperture 278 of valve body 256 and is a secondary seal with respect to the elastomer 308 in this area. In this embodiment of the invention, the O-ring seal 284 of second valve stem 276 could be eliminated if so desired, and as shown in FIGS. 10 and 11, serves as a back-up or secondary seal. It should also be noted, that if different seat assemblies are used, the O-ring 284 of second valve stem 276 may function to provide the primary sealing.

It may be observed in FIGS. 10 and 11, and is apparent from the foregoing, that the housing unit 202 of valve assembly 200 does not provide the operational strength for the valve unit 204. It is, therefore, necessary in this embodiment of the invention, that the valve body 256 be constructed of sufficient thickness to provide the necessary strength requirements.

The valve unit 204 is interchangeable in a manner similar to that described with respect to valve unit 10 in FIGS. 4 and 5. Should it become necessary to replace the valve unit 204, the entire assembly is removed and replaced, thereby eliminating the opportunity that a valve stem might be replaced in a repaired valve unit with a damaged or defective O-ring seal, or with a valve stem misaligned with a valve ball. The replacement valve unit is assembled at the factory under optimum conditions, where there is available sufficient time and tools for a thorough inspection of the valve unit before shipping. It is, therefore, apparent that less down-time is encountered in field repairs of a valve constructed in accordance with the invention.

The valve ball 268 of valve assembly 200 is also of the type known as a "floating" valve member similar to valve ball 82 of valve assembly 14, preiously described. When the valve ball 268 is turned to the closed position, assuming a pressure differential exist across the valve ball 268, the valve ball 268 will move downstream sealingly engaging the surface 310 of elastomer 308. A fluid tight seal is thereby established between the exterior surface of valve ball 268 and the surface 310 of elastomer 308. The seat 300 in the downstream position will furnish the seating support for the valve ball 268 in this position.

EMBODIMENTS OF FIGS. 12 AND 13

Another valve assembly, which is constructed in accordance with the invention, is shown in FIGS. 12 and 13 and is designated by the general reference character 400. The valve assembly 400 basically comprises a housing unit 402 and a valve unit 404.

The housing unit 402 includes a housing 406 having opposite end faces 408 and 410 and a bore 412 extending therethrough. A slot 414 is formed in the housing 406 along the top of the bore 412 for reasons which will become more apparent hereinafter. An aperture 416 extends transversely through the housing 406 intersecting the slot 414. The aperture 416 is provided with a counterbore 418 adjacent its intersection with slot 404 of housing 406, thereby providing a planar surface 420 in the housing 406.

A first valve stem 422 is journaled in the housing 406 and extends through the transversely extending aperture 416. The first valve stem 422 includes a lower flange portion 424 that engages the downwardly facing surface 420 in the housing 406, to limit the upward movement of the first valve stem 422 in the aperture 416. A slot 426 is formed in the flange portion 424 of first valve stem 422 for reasons which will become more apparent hereinafter.

A handle 428 is connected with the upper end of the first valve stem 422 by a pin 430. The handle includes a flange portion 432 that is engageable with a pair of stop pins 434 (only one is shown) to limit the rotational movement of the handle 428 to approximately 90 degrees. The stop pins 434 are disposed in a pair of holes 436 (only one is shown) in housing 406. It may be observed in FIGS. 12 and 13 that the handle 428 will limit the downward movement of the first valve stem 422 in aperture 416.

A pair of flanges 438 extend outwardly from the housing 406 of housing unit 402 and two bolt holes 440 are provided extending therethrough.

The valve unit 404 includes a valve body 442 having an outer periphery 444, sized to slidingly fit into bore 412 of housing 406, and opposite end faces 446 and 448. The length of the body 442 should be approximately the same as the length of the housing 406. A bore 450 extends through the valve body 442, intersecting the end faces 446 and 448. Counterbores 452 and 454 are formed in the valve body 442 of valve unit assembly 404 adjacent the end faces 446 and 448, respectively.

An upper and a lower aperture 456 and 458 are provided, transversely extending through the valve body 442. As shown in FIGS. 12 and 13, the upper and lower apertures 456 and 458 of valve body 442 are in alignment for reasons which will be made apparent hereinafter.

A disc or butterfly valve member 460, having an outer periphery 462, is movably disposed in the bore 450 of valve body 442. A second valve stem 468 extends upwardly from the disc 460 through the transversely extending upper aperture 456 of valve body 442. A rectangular end 470 is formed on the uppermost portion of second valve stem 468 and is shaped to fit into slot 426 of first valve stem 422. A third valve stem 476 extends downwardly from the disc 460 through the transversely extending lower aperture 458 of valve body 442. A conical-shaped portion 478 is formed on the outer end of the third valve stem 476 and is provided with an end point or apex 480. In an assembled position when the valve unit 404 is inserted in the housing unit 402, the apex 480 of the third valve stem 476 is in engagement with the housing 406. The second and third valve stems 468 and 476 may be either rigidly secured to the disc 460, as by pinning, or may be formed integrally with the disc 460, as desired. It will be apparent othat if its stems 468 and 476 are formed integrally with the disc 460, the valve body 442 will need to be split in order to assemble the disc in the body.

An elastomer 482, having an inner periphery 484 and opposite ends 486 and 488, is bonded to the walls of bore 450 and counterbores 452 and 454 of valve body 442 and forms the seat for the valve unit 404. It may be observed in FIG. 12 that the ends 486 and 488 of elastomer 482 project axially outward beyond the ends 446 and 448 of valve body 442, for reasons which will become apparent hereinafter. The elastomer 482 surrounds the stems 468 and 476 and is provided with surfaces 490, 492, 494 and 496, which sealingly engage such stems. The inner periphery 484 of elastomer 482 is tapered from both ends 486 and 488 thereof to a position wherein the inner periphery of the central potrion thereof is of a smaller diameter than the diameter 462 of the disc 460. For example the inner diameter of the central portion of the elastomer 482, in the relaxed condition thereof, may be .040 inch less than the outer diameter of the disc 460. Thus, when the disc 460 is in the closed position, shown in FIGS. 12 and 13, the outer periphery 462 of valve disc 460 will seat on the central portion of elastomer 482 with an interference fit. In a preferred form, the valve body 442, the elastomer 482 and the disc 460 of valve unit 404 are molded together to provide a unitary structure of valve unit 404, which can then be inserted lengthwise into the housing 406 of housing unit 402, as will be described in more detail hereinafter.

OPERATION OF FIGS. 12 AND 13

The valve unit 404 is inserted lengthwise into the housing unit 402 in a manner similar to that described previously for other embodiments of the invention; in particular valve assembly 14 shown in FIGS. 4 and 5. The first valve stem 422 of housing unit 402 is rotated to a position wherein the slot 426 thereof is axially aligned with the bore 412 of housing 406. The second valve stem 468 of valve unit 404 is turned or rotated to a position wherein the parallel side portions of rectangular end 470 thereof is axially aligned with the bore 450 of valve body 442. In this position, the valve unit 404 will slide lengthwise into the bore 412 of housing unit 402, the outer periphery 444 of valve body 442 being sized to provide a sliding fit therein. The rectangular end 470 of second valve stem 468 will basically travel in the area provided by the slot 414 of housing 406. In the assembled position, shown in FIGS. 12 and 13, the rectangular end 470 of second valve stem 468 will be disposed in slot 426 of first valve stem 422 which is provided therefor.

The valve assembly 400 is provided such that it may be installed between two flanges (not shown). When the valve assembly 400 is disposed between two flanges it will be held in an assembled relationship by a plurality of bolts 497. Two of the bolts will extend through the flanges and through the holes 440 provided therefor in housing 406 as shown in cross section in FIG. 13, and the remaining bolts will extend around the outer periphery of housing 406 of housing unit 402. The valve assembly 400 would then be secured in position by nuts (not shown) which would be disposed on opposite ends of the bolts.

As the nuts are tightened, the end faces of the flanges will engage the respective end faces 446 and 448 of valve body 404, and will, also, abut the rerespective end faces 408 and 410 of housing 406. It is apparent, that the ends 486 and 488 of elastomer 482 will be compressed by the flanges and will sealingly engage the end faces of the flanges, thereby preventing leakage of fluid therebetween.

The turning movement of the valve handle 428 of housing unit 402 is transmitted to the disc 460 of valve unit 404, through the interconnection provided at the rectangular end 470 of second valve stem 468 and the slot 426 of first valve stem 422. The valve disc 460 of valve unit 404 may, thus, be rotated from an open position (not shown) to the closed position shown in FIGS. 12 and 13. As the valve 460 of valve unit 404 is rotated, it is apparent from FIGS. 12 and 13 that the third valve stem 476 of valve unit 404 will rotate, following the rotational movement of the valve disc 460. The third valve stem 476 of valve unit 404 will rotate on the apex 480 thereof, which is in engagement with the housing 406.

When the valve disc 460 of valve unit 404 is in the closed position, no fluid will flow through the valve since the outer periphery of 462 of the valve disc 460 will be in sealing engagement with the inner periphery 484 of elastomer 482. In all positions of the disc 460, the fluid is isolated from the housing unit 402 by the elastomer 482 sealingly engaging the flanges (not shown) at the opposite ends of the valve and the second and third valve stems 468 and 476.

Since the components of the housing unit 404 will not be in contact with the fluid flowing through the valve, the housing unit may be constructed of any material such as cast iron or cast steel, the main considerations being strength and economical construction, similar to the embodiment of the valve assembly 14 shown in FIGS. 4 and 5.

It is, therefore, apparent that the material used in the construction of the valve unit 404 may be kept to a minimum, similar to that described for valve unit 10 of FIGS. 4 and 5. Should replacement of the valve unit 404 become necessary, the valve unit 404 is simply slipped out of the housing unit 402 by following the procedure described for the insertion of the valve unit 402, and thus it may be easily and quickly replaced or interchanged. This embodiment of the invention shown in FIGS. 12 and 13, therefore, incorporates the advantages of less downtime and the elimination of the possibility of installing a valve unit with defective seals similar to that described for valve assembly 14 shown in FIGS. 4 and 5.

From the foregoing it will be apparent the present invention provides a valve assembly which can be economically manufactured and quickly and easily repaired in the field by simply inserting a new valve unit in an existing housing unit. Since the valve unit is assembled at the manufacturing plant under optimum conditions with respect to time and the availability of proper tools and test equipment the chance that a repaired valve is assembled in the field with a damaged or defective stem seal is virtually eliminated.

In those applications where the specifications require the components of the valve in contact with the fluid to be constructed of expensive or exotic materials such as stainless steel or ceramics, it is apparent from the foregoing, that one form of the invention provides a valve assembly wherein the material required for those components may be maintained at a minimum. In this form of the invention, the housing unit provides the structural and operating strength of the valve unit, and the housing unit is isolated from the fluid flow by appropriate seal means.

Changes may be made in the construction and arrangement of parts or elements of the various embodiments as disclosed herein without departing from the spirit and scope of the invention as defined in the following claims.

What is claimed is:

1. A valve assembly for controlling the flow of fluid between a pair of aligned pipe flanges interconnected by a plurality of circumferentially spaced bolts comprising:
   a housing unit comprising:
      a housing having opposite end faces, a bore extending therethrough and adapted to be supported between said flanges by said bolts; and
      a first valve stem journaled in the housing; and
   a valve unit supported in the housing unit comprising:
      a valve body of a size to be slid lengthwise into the housing bore and having a bore extending lengthwise therethrough;
      means sealing the opposite ends of the body to the flanges isolating the housing from fluid flowing through the flanges,
      a valve member rotatably supported in the bore of the valve body for opening and closing the valve assembly;
      a second valve stem journaled in the valve body adapted to be connected to said first valve stem when the valve unit is slidingly inserted in the housing unit for transmitting the turning movement of the first valve stem to the valve member; and
      seat means providing a seal between the valve member and the valve body when the valve member is turned to a closed position.

2. The valve assembly of claim 1 wherein the housing includes a flange portion extending outwardly around a portion of the outer periphery of said housing, said flange portion having a plurality of holes provided therethrough to accommodate said bolts.

3. The valve assembly of claim 2 wherein the flange portion is provided with at least four holes spaced circumferentially therearound to accommodate said bolts.

4. The valve assembly of claim 2 wherein the flange portion is provided with not more than two holes spaced circumferentially therearound to accommodate said bolts.

5. The valve assembly of claim 1 wherein the outer periphery of the housing is sized such that the bolts support the housing by contacting the outer periphery thereof.

6. The valve assembly as defined in claim 1 wherein the first valve stem includes a slot in the end thereof adjacent the second valve stem and the second valve stem is shaped to matingly fit in said slot when the valve unit is inserted in the housing.

7. The valve assembly of claim 1 wherein the second valve stem includes a slot in the end thereof adjacent the first valve stem and the first valve stem is shaped to matingly fit in said slot when the valve unit is inserted in the housing.

8. The valve assembly of claim 1 wherein the centerline of the second valve stem extends at right angles to the centerline of the bore in the valve body.

9. The valve assembly of claim 8 wherein the centerline of the first valve stem extends at a right angle to the centerline of the bore in the housing.

10. The valve assembly of claim 1 wherein the first valve stem includes a flange portion on one end portion thereof engaging the housing to limit the movement of the second valve stem in one direction.

11. The valve assembly of claim 1 wherein the first valve stem includes a groove in the outer periphery thereof and a retaining ring in said groove engaging the housing to limit the movement of the first valve stem in one direction.

12. The valve assembly of claim 1 wherein the second valve stem includes a flange portion on one end portion thereof engaging the valve body to limit the movement of the second valve stem in one direction.

13. The valve assembly of claim 1 wherein the second valve stem includes a groove in the outer periphery thereof and a retaining ring in said groove engaging the valve body to limit the movement of the second valve stem in one direction.

14. The valve assembly of claim 1 wherein the second valve stem includes a groove encircling the outer periphery thereof, and an O-ring in said groove sealingly engaging the valve body to form a fluid tight seal therebetween.

15. The valve assembly of claim 1 wherein the valve member is a ball.

16. The valve assembly of claim 1 wherein the valve member is a disc.

17. The valve assembly of claim 15 wherein the seat means includes, a seat ring disposed in one end of the bore of the valve body, and a seal member supported by the seat ring sealingly engaging the ball valve member.

18. The valve assembly of claim 15 wherein the seat means includes a seat ring disposed in each end of the bore of the valve body thereby providing an upstream and a downstream seat means, and a seal member supported by each of said seat rings, each seal member adapted to engage the ball valve member.

19. The valve assembly of claim 18 wherein the means sealing the opposite ends of the valve body to the flanges includes an O-ring disposed between each seat ring and the valve body to form a seal therebetween, a portion of each of said O-rings sealingly engaging the respective flange.

20. The valve assembly of claim 17 wherein the seat ring generally has an L-shaped cross-section forming two legs thereon, and the seal member is supported between the two legs of the seat ring, said seal member has a valve-member end surface shaped to sealingly mate with the exterior surface of the ball valve member, and said valve-member end surface having a plurality of annular grooves therein forming a plurality of lands thereon.

21. The valve assembly of claim 18 wherein each seat ring generally has an L-shaped cross section forming two legs thereon, and the seal member is supported between the two legs of each seat ring, each of said seal members having a valve-member end surface shaped to sealingly mate with the exterior surface of the ball valve member, and each of said valve-member end surfaces having a plurality of annular grooves therein forming a plurality of lands thereon.

22. The valve assembly of claim 20 wherein the non-valve-member end of the seal member includes two sides which are tapered and generally meet at an angle substantially greater than ninety degrees to form a chamber between the seal member and the adjacent leg portions of the L-shaped seat ring.

23. The valve assembly of claim 21 wherein the non-valve-member end of the seal member includes two sides which are tapered and generally meet at an angle substantially greater than ninety degrees to form a chamber between each seal member and the adjacent leg portions of the respective L-shaped seat ring.

24. The valve assembly of claim 17 wherein the seat ring has a substantially flat seating surface formed on the valve-member end thereof, a groove in said seating surface, and the seal member is disposed in said groove, said seal member having a portion thereof extending beyond the seating surface of the seat ring to sealingly engage the valve member.

25. The valve assembly of claim 24 wherein the seal member is bonded to the walls of said groove.

26. The valve assembly of claim 15 wherein the seat means includes:
   a supporting ring disposed in one end of the bore of the valve body and having a first annular groove formed in the valve-member end thereof;
   a seat ring disposed in said first annular groove having a seating surface formed on the valve-member end thereof, a central portion of said seating surface is provided to be tangent to the exterior surface of the ball valve member;

a seal member carried by the seat ring on each side of said tangent portion, each seal member having a portion thereof sealingly engaging the ball valve member, a portion of one of said seal members is exposed to the pressure existing in the valve chamber and a portion of the other said seal member is exposed to the pressure existing in the respective end of the valve body bore; and an elastomer pad bonded to the non-valve-member end of said seat ring positioned to sealingly engage said supporting ring.

27. The valve assembly of claim 26 wherein the supporting ring includes a second annular groove formed in the inner periphery thereof communicating with the first annular groove; and wherein the seat ring includes an axially extending flange portion formed on the non-valve member end thereof extending into said second annular groove, and said elastomer pad is bonded to the non-valve-member end of said flange portion engaging a wall of said second annular groove.

28. The valve assembly of claim 15 wherein the seat means includes; a seat ring disposed in each end of the bore of the valve body having a seating surface formed on the valve-member end thereof, said seating surfaces being shaped to mate with the exterior surface of the ball valve member, and an elastomer seal member bonded to the valve-member ends of the seat rings, said elastomer seal member having a surface shaped to sealingly engage said ball valve member.

29. The valve assembly of claim 28 wherein the elastomer seal member substantially encompasses the valve ball member.

30. The valve assembly of claim 29 wherein the elastomer seal member is bonded to the valve body.

31. The valve assembly of claim 28 wherein the elastomer seal member sealingly engages the second valve stem.

32. The valve assembly of claim 1 wherein the housing is sized to encompass the valve body when the valve body is inserted into the housing and provides radial support for the valve body.

33. The valve assembly of claim 32 wherein the housing includes a slot formed along the inner periphery thereof to receive said second valve stem when the valve unit is being inserted in and removed from the housing unit.

34. The valve assembly of claim 33 wherein the slot extends through the housing intersecting said end faces of the housing.

35. The valve assembly of claim 1 wherein the valve body is generally cylindrical in shape and the bore in the housing is cylindrical in shape to slidingly mate with the valve body.

36. The valve assembly of claim 1 wherein the housing encompasses only a portion of the valve body when the valve unit is inserted in the housing unit.

37. The valve assembly of claim 36 wherein the valve body includes a groove around the outer periphery thereof, said groove being extended from one end face of said valve body, and the inner periphery of the bore in the housing is sized to fit in said groove when the valve unit is inserted in the housing.

38. The valve assembly of claim 37 wherein the housing includes a counterbore at one end of the bore in the housing, and the outer periphery of the valve body is sized to fit in said counterbore when the valve unit is inserted in the housing unit.

39. The valve assembly of claim 16 wherein the seat means includes an elastomer bonded around the inner periphery of the valve body having a central portion thereof shaped to sealingly engage the disc valve member when the disc valve member is turned to the closed position.

40. The valve assembly of claim 39 wherein the central portion of the seat means in the relaxed condition thereof, has a diameter less than the outer diameter of the disc valve member, and the diameter of the seat means on opposite sides of said central portion is progressively increased toward the ends of the valve body.

41. The valve assembly of claim 39 wherein the seat means extends over a portion of each end of the valve body and sealingly engages the flanges.

42. The valve assembly of claim 16 characterized further to include seal means between the second valve stem and the valve body providing a fluid tight seal therebetween.

43. The valve assembly of claim 39 wherein the elastomer includes a surface sealingly engaging the second valve stem, thereby providing a fluid-tight seal between the second valve stem and the valve body.

44. The valve assembly of claim 16 wherein the valve unit includes a third valve stem having an inner and outer end, said inner end engaging the disc valve member.

45. The valve assembly of claim 44 wherein the third valve stem is in alignment with the second valve stem.

46. The valve assembly of claim 44 wherein the third valve stem is journaled in the valve body.

47. The valve assembly of claim 46 wherein the outer end of the third valve stem is in engagement with the inner periphery of the bore in the housing when the valve unit is inserted into the housing unit.

48. The valve assembly of claim 46 wherein the valve unit includes seal means between the third valve stem and the valve body providing a fluid tight seal therebetween.

49. The valve assembly of claim 46 wherein said elastomer includes a surface sealingly engaging the third valve stem, thereby providing a fluid tight seal between the third valve stem and the valve body.

50. A valve assembly for controlling the flow of fluid through adjacent pipe sections, comprising:
a housing unit including:
a housing having opposite end faces, and a bore extending therethrough;
means supporting the housing between the adjacent ends of the pipe sections;
valve operating means supported by the housing; and
a valve unit, including:
a valve body slidingly supported in the bore of the housing and having a bore extending therethrough;
means sealing the opposite ends of the valve body to the pipe sections to direct the flow of fluid from the pipe sections through the bore in the valve body;
a valve member rotatably supported in the bore of the valve body for opening and closing the valve assembly;
a stem journaled in the valve body adapted to be connected to the valve operating means when the valve unit is slidingly inserted in the housing unit for transmitting the turning movement of the valve operating means to the valve member; and
seat means providing a seal between the valve body and the valve member when the valve member is turned to a closed position.

51. A valve assembly for controlling the flow of fluid between a pair of aligned pipe flanges interconnected by a plurality of circumferentially spaced bolts, comprising:
a housing unit comprising:
a housing having opposite end faces, a bore extending therethrough and adapted to be supported between said flanges by said bolts; and
a first valve stem supported in the housing; and
a valve unit supported in the housing unit comprising:
a valve body of a size to be slid lengthwise into the housing and having a valve chamber therein communicating with the opposite ends of the valve body;
means sealing the opposite ends of the body to the flanges isolating the housing from fluid flowing through the flanges;

a valve member supported in the valve chamber for opening and closing the valve assembly;

a second valve stem supported in the valve body and adapted to be connected to said first valve stem when the valve unit is inserted in the housing unit for transmitting movement of the first valve stem to the valve member; and seat means providing a seal between the valve member and the valve body when the valve member is moved to a closed position.

52. A valve assembly for controlling the flow of fluid through adjacent pipe sections, comprising:

a housing unit including:
- a housing having opposite end faces and a bore extending therethrough;
- means supporting the housing between the adjacent ends of the pipe sections;
- valve operating means supported by the housing; and a valve unit, including:
- a valve body slidingly supported in the bore of the housing and having a valve chamber therein communicating with the opposite ends of the valve body;
- means sealing the opposite ends of the valve body to the pipe sections to direct the flow of fluid from the pipe sections through the valve chamber in the valve body;
- a valve member supported in the valve chamber for opening and closing the valve assembly;
- a stem supported in the valve body adapted to be connected to the valve operating means when the valve unit is inserted in the housing unit for transmitting movement of the valve operating means to the valve member; and
- seat means providing a seal between the valve body and the valve member when the valve member is moved to a closed position.

53. A valve assembly for use between a pair of aligned pipe flanges interconnected by a plurality of circumferentially spaced bolts, comprising:

a valve unit including:
- a valve body having a valve chamber therein;
- a valve member supported in the valve chamber for opening and closing the valve assembly;
- a valve stem supported in the valve body and connected to the valve member;
- seat means providing a seal between the valve member and the valve body when the valve member is moved to a closed position; and a housing unit including,
- a housing having a bore sized to slidingly receive and support the valve unit; and
- means carried by the housing to engage the valve stem for moving the valve member between open and closed positions; and wherein the outer periphery of the valve body is substantially cylindrical and the bore in the housing is substantially cylindrical, with the outer diameter of the valve body and the diameter of the bore in the housing being substantially equal to provide a sliding fit of the valve body in the housing.

54. The valve assembly of claim 53 wherein the valve body and the housing are of substantially the same length.

References Cited

UNITED STATES PATENTS

| | | | |
|---|---|---|---|
| 2,092,261 | 9/1937 | Rector | 251—291 X |
| 3,073,336 | 1/1963 | Johnson | 251—367 X |
| 3,081,792 | 3/1963 | Hansen | 251—367 X |
| 3,118,465 | 1/1964 | Scaramucci | 137—454.2 |
| 3,348,804 | 10/1967 | Piccardo | 251—367 X |

M. CARY NELSON, Primary Examiner

W. R. CLINE, Assistant Examiner

U.S. Cl. X.R.

251—315